May 1, 1951 — L. L. WHITNEY — 2,550,743
METHOD OF WELDING BRAKE BEAMS
Filed Oct. 1, 1948
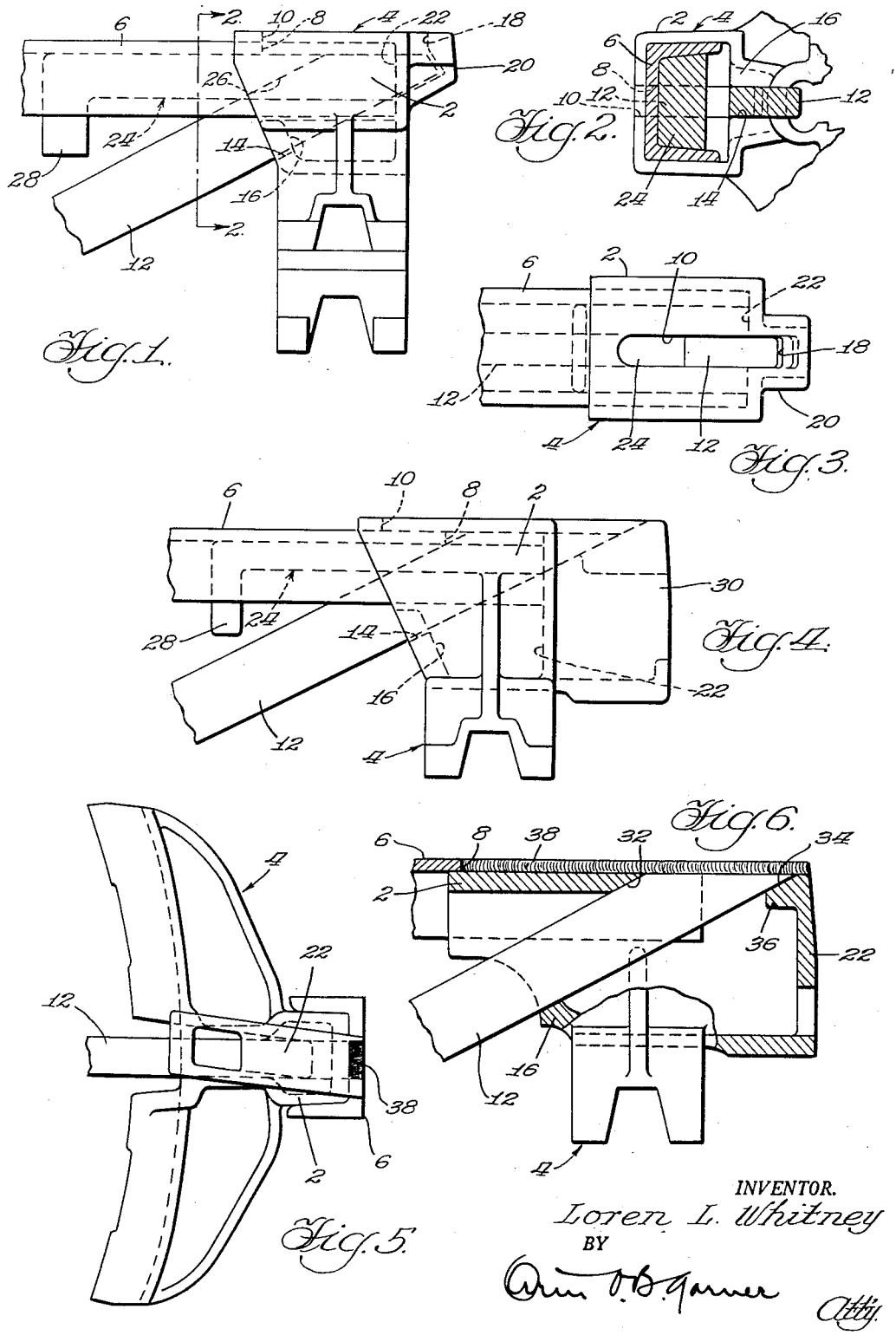
INVENTOR.
Loren L. Whitney Patented May 1, 1951

2,550,743

UNITED STATES PATENT OFFICE 2,550,743

METHOD OF WELDING BRAKE BEAMS

Loren L. Whitney, Hammond, Ind., assignor to American Steel Foundries, Chicago, Ill., a corporation of New Jersey Application October 1, 1948, Serial No. 52,270

6 Claims. (Cl. 219—10)

This invention relates to the welding of structures, such as brake beams, which are subjected to severe and repeated stresses in service.

Welded brake beams have generally proved to be impractical in railway service because of weld defects, such as shrinkage cracks, porosity, and sink holes, which are insignificant in many welded structures but which cause brake beam failures as the result of unusually severe stresses to which such beams are subjected.

For this reason the manufacturers of brake beams have long sought to produce an elongated, homogeneous, solid weld capable of connecting brake beam parts and entirely free of shrinkage cracks and other weld defects which ordinarily cause welded brake beams to fail in service.

According to the present invention, shrinkage cracks and porosity are eliminated by superimposing elongated weld layers in a plurality of passes with a dwell at the end of each pass and, preferably after the weld has been completed, a reservoir of molten metal is provided to feed the cooling weld and prevent formation of shrinkage cracks therein. This reservoir is provided by means of a plug weld at the center of the completed weld.

The foregoing and other objects and advantages of the invention will become apparent from a consideration of the following specification and the accompanying drawings, wherein:

Figure 1 is a fragmentary top plan view of a brake beam structure to be welded by the novel process;

Figure 2 is a sectional view on the line 2—2 of Figure 1;

Figure 3 is a rear elevation of the beam taken from the top of Figure 1;

Figure 4 is a fragmentary top plan view of another form of brake beam structure to which the process is applicable; and Figures 5 and 6 are, respectively, an end view and a top plan view, partly in section, of still another form of brake beam structure to which the process is applicable.

Describing the invention in detail and referring first to the novel process as applied to the structure shown in Figures 1 to 3, the brake beam parts are clamped in the assembled relationship illustrated, with a box-section portion 2 of a cast steel brake head 4 sleeved over a generally U-section or channel-section steel compression member 6. The rear wall of the compression member is slotted at 8 (Figures 1 and 2) and the rear wall of the brake head portion 2 is slotted as at 10. A steel tension member 12 is disposed within a complementary slot 14 (Figure 2) of an inboard wall 16 of the brake head 4 and the outboard end of the tension member extends into a socket 18 formed by a lug 20 on an outboard wall 22 of the brake head.

Preferably, a bifurcated filler block 24 is fitted over the tension member 12 and is snugly fitted within the compression member 6 in snug abutment as at 26 with the tension member 12 to dam the flow of molten weld metal during the welding process, as hereinafter described. The block 24 is preferably formed of steel in which case the block is welded to the brake beam parts during the welding operation; and the block is preferably provided with a lug 28 (Figure 1) to facilitate application of the block.

With the brake beam parts clamped in the assembled relationship shown in Figures 1 to 3, a weld is laid in the slots 8 and 10, as hereinafter described, fusing the brake head 4, the tension member 12, and the compression member 6 into a unitary truss structure. The weld may be of any conventional arc type but is preferably of the type disclosed in United States Letters Patent No. 2,043,960, issued June 9, 1936, to Union Carbide and Carbon Corporation.

The welding technique, described in the above patent as applied to the present invention, comprises connecting the beam parts to one terminal and a welding electrode to another terminal of a conventional voltage supply. The electrode is positioned at one end of the slot 8, preferably the outboard end thereof, and a readily fusible conductor, such as a piece of steel wool, is placed between the electrode and the tension member. If high frequency current is used momentarily to establish an arc, the steel wool may be eliminated. The slots 8 and 10 are then filled with a prefused, powdered welding composition of the characteristics described in the above patent, the composition being electrically conductive when molten and being readily fusible at the temperature developed upon closing of the electrical circuit through the brake beam and electrode.

The novel process is initiated by closing the welding circuit and the electrode is passed to the inboard end of the slot at a rate of speed accommodating a layer of weld metal from end to end of the slot. The circuit is then broken for a brief period of time, preferably from about three to six seconds, to accommodate conduction of heat from the weld area. During this period the electrode dwells at the inboard end of the slot until the circuit is again closed whereupon the electrode is passed to the outboard end of the slot to deposit a second layer of weld metal over the first layer. The circuit is again broken for a brief period of time, preferably from about three to six seconds, while the electrode dwells at the outboard end of the slot, whereupon the circuit is again closed and the electrode is passed to the inboard end of the slot to deposit a third layer of metal. After another brief dwell of preferably about three to six seconds with the electrode at the inboard end of the slot, the circuit is again closed and the electrode is passed to a point approximately midway between the inboard and outboard ends of the slot whereupon the circuit is broken and the electrode dwells at this point for a brief period of preferably from about three to six seconds.

In order to prevent shrinkage cracks and formation of a sink hole at the center of the weld, a plug weld is preferably made after the last dwell of the electrode between the inboard and outboard ends of the slot. This plug weld is preferably formed by closing the weld circuit with the electrode stationary at the center of the slot for a brief period of preferably from about three to six seconds whereupon the circuit is again broken while the electrode dwells at the center of the slot for a brief period of time, preferably of the order of three to six seconds, after which the circuit is again closed for a period of from about three to six seconds, with the electrode stationary, to provide a second plug weld on top of the first.

It will be understood that the above-described procedure is particularly applicable to a beam structure, such as that shown in Figures 1 to 3, wherein a relatively deep cavity, such as that formed by the slots 8 and 10, is filled by the weld metal; however, in the event that a shallower cavity is to be welded, a single pass, as above described, or a pass and a half may be made with a plug weld at the center to afford a reservoir of molten metal thereby preventing the formation of shrinkage cracks in the cooling weld.

It will be understood that normally the structure shown in Figures 1 to 3 is welded with the slots 8 and 10 facing upwardly, as shown in Figure 3, so that the reservoir of molten metal provided by the plug weld feeds downwardly by force of gravity to the cooling weld metal.

The above-described process results in a weld which shows no layers under microscopic examination but is a homogeneous solid weld without the slightest trace of shrinkage cavities; and brake beams welded in this manner have indicated remarkable qualities of strength and endurance.

Figure 4 illustrates a modified form of brake beam which may be fabricated according to the novel process, and parts corresponding to those of Figures 1 to 3 are identified by corresponding numerals, the principal distinction being the provision of a guide lug 30 on the outboard brake head wall 22, said lug being adapted for reception, in well known manner, within an associated truck frame bracket (not shown) to accommodate slidable support for the beam.

Figures 5 and 6 show still another form of beam to which the novel process may be applied, the principal difference between the modification of Figures 5 and 6 and that of Figure 4 being the manner in which the box-section portion 2 of the beam is fitted within the compression member 6 to eliminate the necessity for a filler block, such as that shown at 24 in the embodiments of Figures 1 to 3 and Figure 4. Referring to Figure 6, it will be seen that the rear wall of the brake head portion 2 is formed at the inboard edge of its slot with a diagonal surface 32 complementary to and snugly fitted against the tension member 12 which is seated at its outboard end along a similar surface 34 formed at the outboard end of the brake head slot. The outboard brake head wall 22 in the embodiment of Figures 5 and 6 is provided with a lug 36 (Figure 6) on which the diagonal surface 34 is formed and the weld metal is indicated at 38.

Thus it will be apparent that the novel process is applicable to any suitable design of brake beam wherein the weld metal is deposited in an elongated slot.

I claim:

1. In electric welding, the steps of first depositing an elongated layer of weld metal along adjoining edges of electrically conductive work pieces by making a pass therealong with a fusible electrode of said metal while striking an arc between said electrode and one of said work pieces to melt said electrode, then holding the electrode stationary while breaking the arc for a period of time less than that required for the weld metal to solidify to accommodate conduction of heat through said work pieces from said edges, then making a reverse pass over said layer while striking an arc between the electrode and one of the work pieces, then breaking the last-mentioned arc for a period of time less than that required for the weld metal to solidify to accommodate conduction of heat through said work pieces from said weld metal, and then holding said electrode stationary at the center of said layer while striking an arc between said electrode and one of said work pieces to deposit a reservoir of molten metal at the center of said layer.

2. In electric welding of work pieces, the steps of making a plurality of passes with an electrode of fusible weld metal along adjoining elongated surfaces of electrically conductive work pieces while striking an arc between the electrode and one of the work pieces to melt the electrode, breaking the arc at each end of each pass for a period of time less than that required for the weld metal to solidify, then striking an arc between the electrode and one of the work pieces and making a half pass with said electrode to approximately the center of said weld metal, then breaking the last-mentioned arc for a period of time less than that required for the weld metal to solidify, and then depositing a reservoir of said weld metal by holding the electrode stationary at approximately the center of the weld metal while striking an arc between said electrode and one of the work pieces.

3. In electric welding of work pieces, the steps of depositing an elongated layer of weld metal from a fusible metallic electrode along adjoining surfaces of electrically conductive work pieces by striking an arc between one of the work pieces and the electrode to melt the latter and moving the latter along said surfaces, then breaking the arc and moving the electrode to approximately the center of said layer, and then before the weld metal solidifies, striking an arc between said workpiece and the electrode while holding the latter stationary, to deposit a reservoir of molten metal at approximately the center of said layer for feeding shrinkage cracks in the weld metal of said layer as it solidifies.

4. In electric welding, the steps of first depositing an elongated layer of weld metal along adjoining edges of electrically conductive work pieces by passing a fusible metal electrode in one direction along said edges while striking an arc between said electrode and one of said work pieces to melt the electrode, then breaking the arc for a period of time less than that required for the weld metal to solidify, then depositing another layer of weld metal by passing said electrode in reverse direction over said first-mentioned layer while striking an arc between the electrode and one of the work pieces, and then depositing a reservoir of molten weld metal by striking an arc between the electrode and one of the work pieces while holding the electrode stationary at approximately the center of the second-mentioned layer.

5. A method of electric welding comprising passing an electrode of fusible material along adjoining surfaces of electrically conductive work pieces while striking an arc between the electrode and one of the work pieces to melt the electrode and deposit a layer of said material, then breaking the arc and moving the electrode to approximately the center of the layer of the deposited weld material, and then striking an arc between the electrode and one of the work pieces while holding the electrode stationary to deposit a reservoir of molten weld material, to feed shrinkage cracks in the layer as it solidifies.

6. A method of welding adjoining surfaces of ferrous metal comprising the steps of depositing an elongated layer of weld metal along said surfaces, and then, before said layer has solidified, depositing a reservoir of molten metal to feed shrinkage cracks in said weld metal by plug welding the center of said layer approximately intermediate its ends.

LOREN L. WHITNEY.

REFERENCES CITED

The following references are of record in the file of this patent:

UNITED STATES PATENTS

| Number | Name | Date |
|---|---|---|
| 1,464,076 | Jones | Aug. 7, 1923 |
| 2,344,534 | Bucknam et al. | Mar. 21, 1944 |